A. C., J. M. & L. C. EVANS.
Harrow.
No. 223,492.  Patented Jan. 13, 1880.
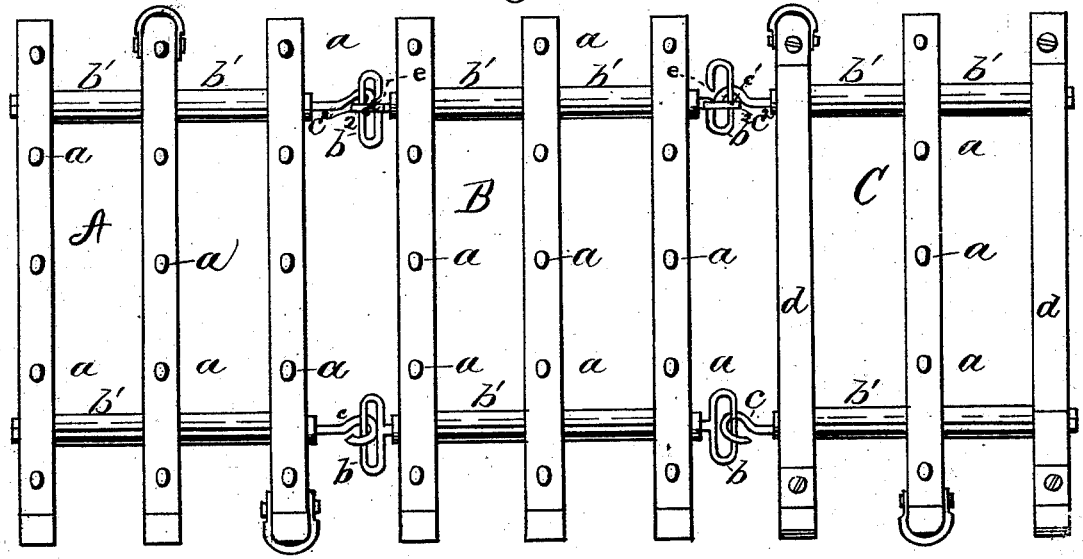
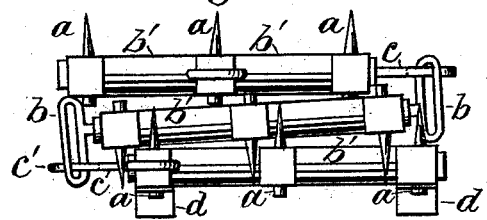
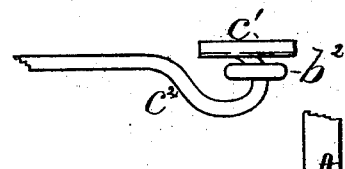
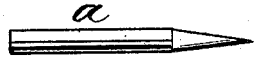
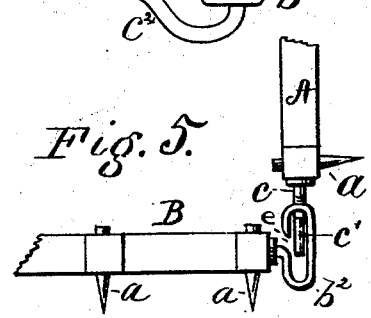

UNITED STATES PATENT OFFICE.

AUSTIN C. EVANS, JONATHAN M. EVANS, AND LOUIS C. EVANS, OF SPRINGFIELD, OHIO.

HARROW.

SPECIFICATION forming part of Letters Patent No. 223,492, dated January 13, 1880.

Application filed September 13, 1879.

*To all whom it may concern:*

Be it known that we, AUSTIN C. EVANS, JONATHAN M. EVANS, and LOUIS C. EVANS, all residents of the city of Springfield, in the county of Clarke and State of Ohio, have jointly invented certain Improvements in Harrows, of which the following is a full, clear, and exact specification, reference being had to the drawings accompanying the same.

Our invention relates to the devices for coupling the sections together, and to the manner of folding the said sections together when it is to be drawn from one field to another. Our harrow is made in the usual form of three or more sections coupled together.

We are aware that in the present state of the art sectional harrows are not new, and that such harrows have also been constructed so as to admit of being folded together; but the peculiar devices for coupling the sections together and the compact manner in which they are folded are, we believe, new.

Figure 1 shows a view of the harrow when extended ready for operation. Fig. 2 shows the same when folded. Fig. 3 is an enlarged view of the coupling. Fig. 4 represents an elevation and a cross-section of one of the teeth. Fig. 5 is a detached view, showing the central section in a horizontal position and an outer section of the harrow in a vertical position, to uncouple said sections.

The view Fig. 1 shows a two-horse harrow which is made in three sections, A, B, and C, coupled together by loops $b$ $b^2$ and hooks $c$ $c^2$. Each section consists of three square beams of wood, of the usual form, placed the required distance apart, with the cylindrical wooden sleeves $b'$ interposed between them. Through both beams and sleeves at the ends of each section extend rods (similar to those already in use to connect them) having loops and hooks on them.

The central section, B, is provided on each of its longitudinal sides with rods passing through the sleeves $b'$, and secured to the section by nuts or their equivalents. Closed links $b$ are secured to the ends of one of these rods, and open links $b^2$ are secured to the ends of the other rod, which passes through the sleeves $b'$. Hooks $c$ $c$, of ordinary construction, on the ends of rods passing through sleeves $b'$ in the end sections, engage, when the sections are coupled together, with the closed links $b$ of the central section.

$c^2$ $c^2$ are hooks, having a bar, $c'$, formed on the point of each, in line with the shank of the hook and its rod, and when the sections are coupled the bar $c'$ extends across the open link $b^2$, and is at right angles with it.

In uncoupling the sections the outer ones are raised to occupy a vertical position, as shown in Fig. 5, and the cross-bar $c'$ is passed through the opening $e$ in the open link $b^2$, disengaging the hooks $c^2$ from the open links, and at the same time the hooks $c$ $c$ are withdrawn from the closed links $b$ $b$, thus uncoupling the sections.

The coupling of the sections is easily effected by inserting the hooks $c$ $c$ in the closed links $b$, and bringing the cross-bar $c'$ opposite the opening $e$ in the open link $b^2$ and inserting it therein. When coupled or connected with the open loop $b^2$, this bar $c'$ extends across the open loop $b^2$ at right angles thereto, and prevents any disengagement of the hook except when the section A or C is raised or thrown up vertically, so as to bring the bar $c'$ of the hook $c^2$ in line with the opening $e$ of the loop $b^2$, when it can be slipped out by moving the raised section (A or C) endwise, as may be seen in Fig. 1, and in the detached section, Fig. 5.

When the harrow is in its operative position the coupling will remain connected, its form allowing for any undulatory motion of the sections which may be caused by uneven ground without any danger of disconnection; whereas when either of the outer sections are raised, as described, the disconnection is readily made.

Heavier harrows, for three horses, are made with four of the beams in each section.

By reference to Fig. 2 it will be seen that the loops $b$ $b^2$ are vertical, and the opening through them being from front to rear, while the bar $c'$ of the hook $c^2$ extends across the loop on one side at right angles to its length, the hook having free play up and down in the loop.

In Fig. 3 the loop $b^2$ is shown endwise and the hook $c^2$ inserted through it, with its end bar $c'$ extending across it, showing clearly the relative positions of the two parts of the coupling.

The loops $b\ b^2$ are made long, for the double purpose of allowing free up-and-down motion to the sections and to permit the sections to lie flat upon each other when folded.

It will be noticed that section C is provided with runners $d$ on the tops of the two outside beams of that section. Runners are old, and we make no claim to them.

The manner of folding can be understood by reference to Figs. 1 and 2. The runner-section C is first doubled under the middle section, B, which latter remains exactly in the same position as when in operation—i. e., with points of its teeth downward—while the section A is folded back on it. This manner of folding the sections of a harrow is believed to be new.

In other harrows, the runners being on the middle section, the two outside sections are necessarily folded upon it alternately, and do not, consequently, lie flat upon each other, as shown in our improvement. While in the mode of folding shown there can be but one way of folding, others can have either of the outside sections folded down first upon the runner-section.

The teeth of the two sections A and C, when folded as seen in Fig. 2, have their points upward, C being folded under, and A on top, of the middle section, B. This mode of folding makes the harrow much more compact and easier handled.

The teeth of our improved harrow are oval in cross-section, (see Fig. 4,) so as to operate as a wedge upon the soil, thus decreasing the draft. These teeth, oval in cross-section, are inserted in oval-shaped orifices made in the beams, and somewhat smaller in diameter than the teeth, and are driven into the orifices in the beams, the major axes of the orifices and oval-shaped teeth being in line with or parallel to the length of the beam to prevent splitting.

We claim as our improvement—

1. The central section, B, provided with the closed links $b\ b$ and open links $b^2$, in combination with the end sections, A C, provided with the hooks $c\ c^2$, each of the latter having a bar, $c'$, formed on its point and in line with shank, and extending across the open link, whereby the sections are securely coupled and can readily be uncoupled, substantially as described.

2. The combination, with the central section, B, provided with the links $b\ b^2$ on the ends of rods passing through the sleeves $b'$, and the end sections, A C, having the hooks $c\ c^2$, of the runners $d$, secured to said end section, C, whereby the section C may be folded under the central section and the section A over said central section, substantially as described.

AUSTIN C. EVANS.
JONATHAN M. EVANS.
LOUIS C. EVANS.

Attest:
B. C. CONVERSE,
H. S. SHOWERS.